March 11, 1930. S. W. ROTHERMEL ET AL 1,750,361
SPEED ADJUSTING DEVICE FOR MOTOR GOVERNORS
Filed Sept. 16, 1929 2 Sheets-Sheet 1
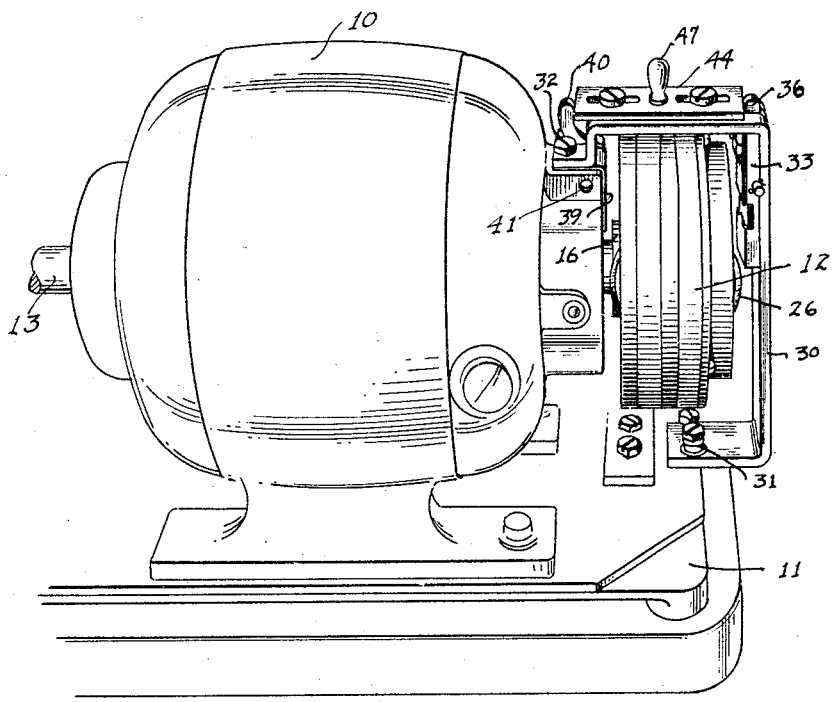
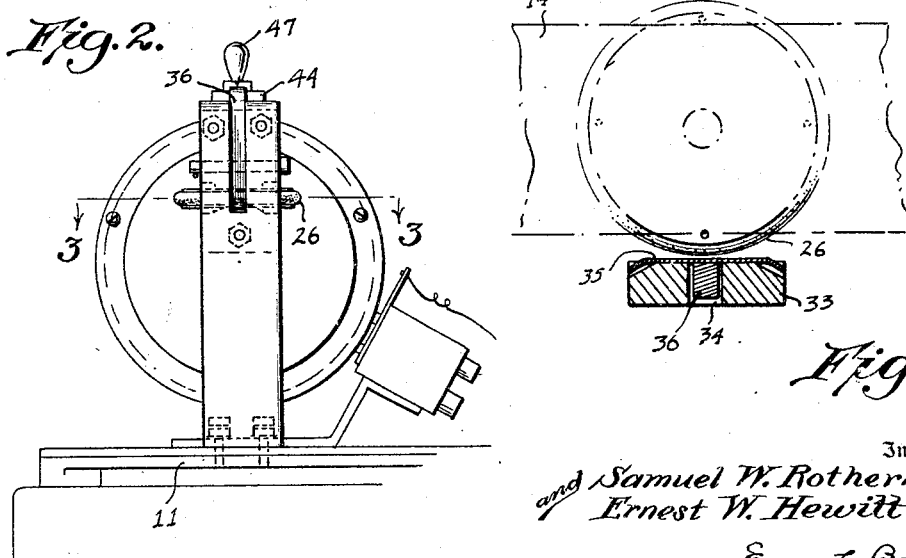
Inventors
Samuel W. Rothermel
and Ernest W. Hewitt
Eugene C. Brown
Attorney March 11, 1930.     S. W. ROTHERMEL ET AL     1,750,361
SPEED ADJUSTING DEVICE FOR MOTOR GOVERNORS
Filed Sept. 16, 1929     2 Sheets-Sheet 2
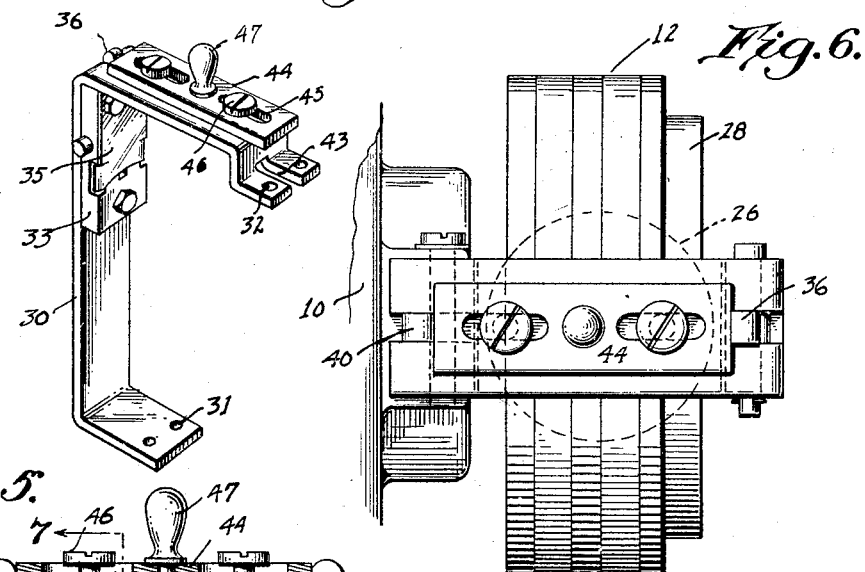
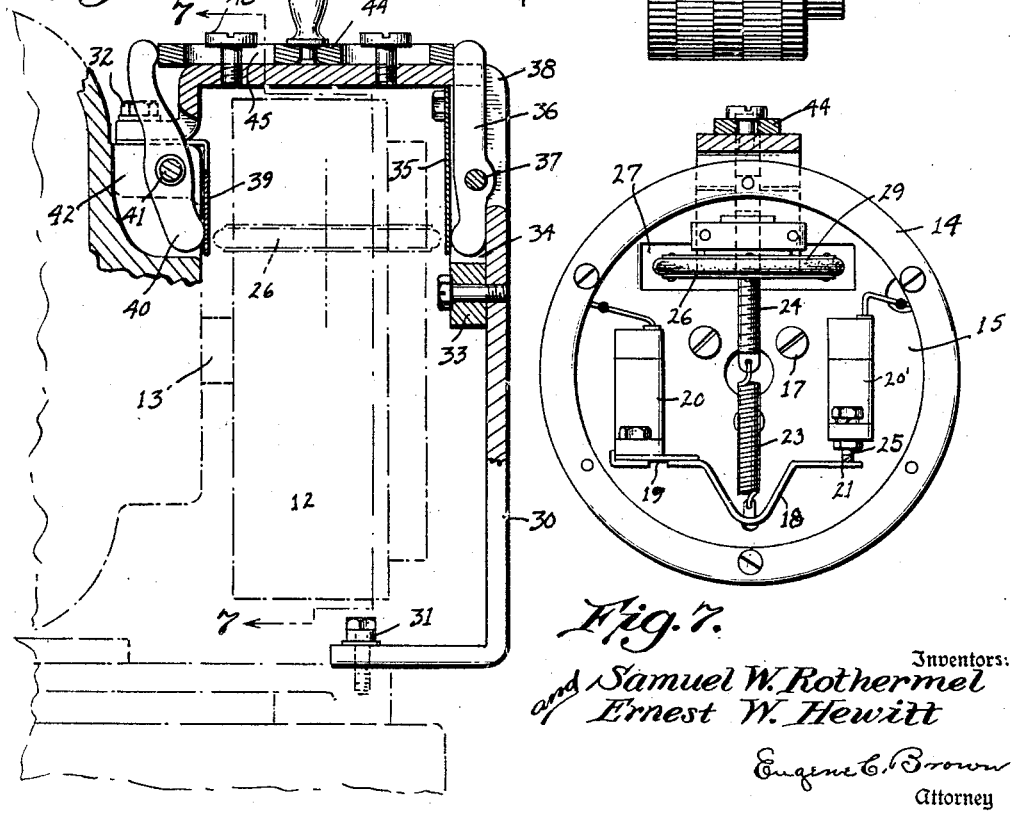
Inventors:
Samuel W. Rothermel
Ernest W. Hewitt
Eugene C. Brown
Attorney Patented Mar. 11, 1930

1,750,361

UNITED STATES PATENT OFFICE

SAMUEL W. ROTHERMEL, OF LYNBROOK, NEW YORK, AND ERNEST W. HEWITT, OF STAMFORD, CONNECTICUT, ASSIGNORS TO THE WESTERN UNION TELEGRAPH COMPANY, OF NEW YORK, N. Y., A CORPORATION OF NEW YORK

SPEED-ADJUSTING DEVICE FOR MOTOR GOVERNORS

Application filed September 16, 1929. Serial No. 393,008.

This invention relates to a governor for an electric motor and more particularly to a mechanism for adjusting the speed of the motor.

The governor to which the present invention relates is designed particularly for maintaining constant, the speed of the driving motor of a telegraph transmitting and printing machine, although it is not limited thereto.

In printing telegraph systems, as for instance those employing so-called simplex printers the driving motors of the transmitting and printing apparatus at distant stations are operated at a definite prearranged speed, observation being made from time to time, by means of a stroboscope, to determine if the proper speed is being maintained and to serve as a guide for adjustment of the speed through manipulation of the motor governor. Since the speed of the motors of the printing and transmitting apparatus must be closely matched for proper reception of the telegraph code signals, the adjustment must be made frequently and preferably while the driving motor is in operation.

With the standard form of governor employed on the motor it was originally contemplated that the speed adjustment would be made by pressing the finger against a rotating adjusting wheel revolving with the governor. Difficulty has been experienced however, in making the adjustment in this matter due to the inaccessibility of the governor adjusting wheel and to the danger of injury resulting from contact with the rotating governor.

One of the objects of the present invention is therefore, to provide a speed adjusting device for a motor governor which is readily accessible and which may be manipulated to either increase or decrease the motor speed and which does not necessitate the operator coming into contact with a rotating portion of the governor.

Other objects and advantages will appear as the description proceeds.

Reference will now be had to the accompanying drawings for a detailed description of the invention.

Figure 1 is a perspective view of a motor and governor with our invention applied thereto;

Figure 2 is an end elevation of the governor and governor adjustment operating mechanism;

Figure 3 is a section on the line 3—3 of Figure 2;

Figure 4 is a perspective view of the governor adjustment operating mechanism detached from the governor;

Figure 5 is a vertical sectional view through the governor adjustment operating mechanism showing its relation to the governor;

Figure 6 is a plan view of the governor and governor adjustment operating mechanism; and Figure 7 is an end elevation of the governor as viewed from the right of Figure 6 with the cover plate removed.

In Figure 1 is shown an electric motor 10 mounted upon a suitable base 11 which may constitute the base of a simplex transmitting and printing machine. The motor has a governor 12 mounted upon one end of the motor shaft 13 for rotation therewith. The governor, which is of the centrifugal type, has a cylindrical casing 14 provided with a closed end 15. The closed end 15 is secured to a flanged coupling 16 of the motor shaft by screws 17—(see Figure 7).

The governor mechanism includes a weight arm 18 consisting of a small bent strip fastened by a flat spring 19 to a metal bracket 20. The weight arm has at its opposite end a contact 21. A retractile spring 23 fastened to an adjusting screw 24 holds the contact 21 against a companion contact 25 mounted upon a bracket 20' secured to the end 15 of the casing. The contacts 21 and 25 are maintained in engagement until the centrifugal force of the weight arm overcomes the tension of the spring 23, due to the motor exceeding the speed for which the governor is adjusted. When the contacts open a resistance is connected in the motor circuit which tends to reduce the motor speed. The closing and opening of the contacts holds the motor speed constant to the value for which the governor is adjusted.

The tension of the spring 23 may be varied by an adjusting wheel 26 mounted upon the screw 24 so that when the wheel is rotated the screw will move longitudinally thereof. The screw is retained against rotation with the wheel by means not shown. The adjusting wheel extends through an aperture 27 in the closed end 15 of the casing and also through a similar opening in the cover plate 28 so that it may be turned from the exterior of the governor.

The governor mechanism so far described is of standard construction and forms no part of the present invention.

Heretofore, when it was desired to adjust the motor speed during operation of the motor the finger of the operator was brought close to the rotating governor so that each time the adjusting wheel revolved with the governor it would be engaged by the finger and rotated slightly about the adjusting screw 24. For this purpose the adjusting wheel is provided with a leather friction rim 29.

In accordance with our invention we obviate the necessity of bringing the hand of the operator into contact with the rotating governor and provide a readily accessible mechanism for operating the governor adjusting wheel.

A U-shape bracket 30 serving as a guard for the governor and as a support for the adjusting wheel operating mechanism is fastened to the base 11 at 31 and to the motor housing at 32. A block 33 having a vertical recess 34 therein is secured to the inside of the vertical arm of the bracket 30 at the upper end thereof and has a spring 35 extending across the face thereof. A lever 36 is pivoted at 37 within the recess 34 so that upon movement of the upper end of the lever to the right the spring 35 will be moved outward in position to engage the adjusting wheel as it revolves with the governor and rotate it in one direction, to either increase or decrease the tension of the spring 23 and consequently to increase or decrease the speed of the motor. The bracket 30 is slotted at 38 to permit the pivotal movement of the lever 36.

The adjusting wheel may be moved in the opposite direction by a second spring member 39 secured at 32 to the motor housing and flexed towards the adjusting wheel by a lever 40 pivoted at 41 to a bifurcated lug 42. The end of the bracket 30 is slotted at 43 between the holding bolts 32 and the lever 40 extends through such slot. A sliding block 44 having guide slots 45 and guide screws 46 is mounted upon the upper horizontal arm of the bracket 30, between the upper ends of the levers 36 and 40. It is automatically centered by the two levers under the influence of the springs 35 and 39. A small handle 47 is provided for moving the block 44 in either direction, to decrease or increase the speed of the motor.

It will be noted that we have provided an operating mechanism for the adjusting wheel 26 which is readily accessible for operation and which permits the governor to be easily adjusted during operation of the motor and without endangering the operator. It is to be understood that numerous changes may be made in the construction of the adjusting wheel operating mechanism without departing from the invention and we contemplate all such changes within the scope of the appended claims.

What is claimed is:

1. The combination with a motor governor having a cylindrical housing and an adjusting wheel projecting from each end thereof and revolving therewith, of operating means for said adjusting wheel comprising a spring member disposed at each end of said housing normally out of contact with said adjusting wheel and a sliding member mounted to one side of said housing for moving either of said spring members into position for engagement with said adjusting wheel during its revolution with said housing.

2. The combination with a motor governor having a cylindrical housing and an adjusting wheel projecting from each end thereof and revolving therewith, of operating means for said adjusting wheel comprising a bracket extending partially around said housing, a spring member supported by said bracket at one side of said housing and normally out of contact with said adjusting wheel, a lever pivoted behind said spring member and extending above said bracket and means on said bracket for operating said lever to move the spring member into the path of travel of said adjusting wheel.

3. The combination with a motor governor having a cylindrical housing and an adjusting wheel projecting from each end thereof and revolving therewith, of operating means for said adjusting wheel comprising a spring member disposed at each end of said housing normally out of contact with said adjusting wheel and a sliding member mounted to one side of said housing for moving either of said spring members into position for engagement with said adjusting wheel during its revolution with said housing, said sliding member normally being held in a neutral position by said spring members.

4. The combination with a motor governor having a cylindrical housing and an adjusting wheel projecting from each end thereof and revolving therewith, of operating means for said adjusting wheel comprising a bracket extending across one side of said housing, a spring member disposed at each end of said housing normally out of contact with said adjusting wheel, a lever for each of said spring members for moving the same into position to be engaged by said adjusting wheel, said levers extending beyond said bracket and means mounted upon said bracket engaging either of said levers to operate the same.

5. The combination with a motor governor having a cylindrical housing and an adjusting wheel projecting from each side thereof and revolving therewith, of operating means for said adjusting wheel comprising a bracket extending across the top of said housing, a spring member disposed at each end of said housing normally out of contact with said adjusting wheel, a lever for each of said spring members for moving the same into position to be engaged by said adjusting wheel, said levers extending above said bracket and a sliding member mounted upon said bracket between said levers for engagement therewith and movable in either direction for selectively operating the same.

In testimony whereof we affix our signatures.

SAMUEL W. ROTHERMEL.
ERNEST W. HEWITT.